US008521433B2

(12) United States Patent
Hirabayashi et al.

(10) Patent No.: US 8,521,433 B2
(45) Date of Patent: Aug. 27, 2013

(54) METHODS AND SYSTEMS FOR PROCESSING ACOUSTIC WAVEFORM DATA

(75) Inventors: Nobuyasu Hirabayashi, Yokohama (JP); W Scott Leaney, Katy, TX (US); Jakob Brandt Utne Haldorsen, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 242 days.

(21) Appl. No.: 12/420,029

(22) Filed: Apr. 7, 2009

(65) Prior Publication Data
US 2009/0259404 A1 Oct. 15, 2009

Related U.S. Application Data

(60) Provisional application No. 61/043,401, filed on Apr. 9, 2008.

(51) Int. Cl.
*G01V 1/40* (2006.01)
*G01V 1/28* (2006.01)

(52) U.S. Cl.
CPC .............. *G01V 1/28* (2013.01); *G01V 2210/47* (2013.01); *G01V 2210/66* (2013.01); *G01V 2210/679* (2013.01)
USPC .................................................. 702/9; 702/7

(58) Field of Classification Search
CPC .......... G01V 2210/47; G01V 2210/66; G01V 2210/679
USPC ....................................... 702/9, 11
See application file for complete search history.

(56) References Cited

U.S. PATENT DOCUMENTS

| 4,562,557 | A  | * | 12/1985 | Parks et al. ...................... 367/27 |
| 4,703,460 | A  | * | 10/1987 | Kurkjian et al. ................. 367/31 |
| 5,077,697 | A  | * | 12/1991 | Chang .............................. 367/31 |
| 5,808,963 | A  | * | 9/1998  | Esmersoy ........................ 367/31 |
| 5,999,484 | A  |   | 12/1999 | Kimball et al. |
| 6,366,531 | B1 | * | 4/2002  | Varsamis et al. ................. 367/26 |
| 6,832,159 | B2 | * | 12/2004 | Smits et al. ..................... 702/11 |
| 6,839,658 | B2 | * | 1/2005  | Causse et al. ................... 702/182 |
| 6,842,400 | B2 | * | 1/2005  | Blanch et al. ................... 367/30 |
| 6,956,790 | B2 | * | 10/2005 | Haldorsen ....................... 367/25 |
| 7,120,541 | B2 | * | 10/2006 | Wang .............................. 702/11 |
| 7,970,544 | B2 | * | 6/2011  | Tang et al. ...................... 702/11 |
| 2002/0180613 | A1 | * | 12/2002 | Shi et al. ..................... 340/853.1 |
| 2003/0151976 | A1 | * | 8/2003  | Leaney ........................... 367/38 |
| 2005/0261835 | A1 |   | 11/2005 | Wang |
| 2006/0233047 | A1 | * | 10/2006 | Zeroug et al. .................... 367/25 |
| 2006/0285437 | A1 | * | 12/2006 | Sinha et al. ..................... 367/37 |

OTHER PUBLICATIONS

Yang, Xiaoning et al., Geometric Spreading of Pn and Sn in a Spherical Earth Model, Dec. 2007, Bulletin of the Seismological Society of America, vol. 97, No. 6, pp. 2053-2065.*

(Continued)

*Primary Examiner* — Sujoy Kundu
*Assistant Examiner* — Timothy H Hwang
(74) *Attorney, Agent, or Firm* — Jianguang Du; Jody DeStefanis

(57) ABSTRACT

Methods and systems for processing acoustic measurements related to subterranean formations. The methods and systems provide receiving acoustic waveforms with a plurality of receivers, deriving slowness of the formation based on the acoustic waveforms, and modeling dominant waveforms in the acoustic waveforms based on the formation slowness, wherein deriving the formation slowness comprises parametric inversion for complex and frequency dependent slowness and the derived complex slowness has real and imaginary parts.

17 Claims, 10 Drawing Sheets

(56) References Cited

OTHER PUBLICATIONS

Definition of "Derive", http://www.thefreedictionary.com/p/derive, last accessed Mar. 31, 2012.*

Borland, W., Edwards, J., Kurniawan, H., Goossens, P. and Fuping, Z., 2007, "Borehole acoustic reflection survey for geosteering validation," 1st Annual Middle East Regional Symposium, SPWLA.

Esmersoy, C., 1988, "Velocity estimation from Offset VSPs using direct P and converted SV waves," 58th Ann. Internat. Mtg., Soc. Expl. Geophys.,Extended Abstracts, pp. 538-541.

Esmersoy, C., 1990, "Inversion of P and SV waves from multicomponent offset vertical seismic profiles," Geophysics, 55, pp. 39-50.

Esmersoy, C., Chang, C. Kane, M., Coates, R., Tichelaar, B., and Quint, E., 1998, "Acoustic imaging of reservoir structures from a horizontal well," The Leading Edge, 17, pp. 940-946.

Haldorsen, J. B. U., Voskamp, A., Thorsen, R., Vissapragada, B., Williams, S. and Fejerkov, M., 2006, "Borehole acoustic reflection survey for high resolution imaging," 76th Ann. Internat. Mtg., Soc. Expl. Geophys., Extended Abstracts, pp. 314-318.

Hornby, B. E., 1989, "Imaging of near-borehole structure using full-waveform sonic data," Geophysics, 54, pp. 747-757.

Leaney, W. S. and Esmersoy, C., 1989, "Parametric decomposition of offset VSP wavefields," 59th Ann. Internat. Mtg., Soc. Expl. Geophys., Extended Abstracts, pp. 26-29.

Leaney, W. S., 1990, "Parametric wavefield decomposition and applications," 60th Ann. Internat. Mtg., Soc. Expl. Geophys., Extended Abstracts, pp. 1097-1100.

Yamamoto, H., Haldorsen, J. B. U., Mikada, H. and Watanabe, S.,1999, "Fracture imaging from sonic reflection and mode conversion," 69tth Ann. Internat. Mtg., Soc. Expl. Geophys., Extended Abstracts, pp. 148-151.

Roever, W. L., Rosenbaum, J. H., and Vining, T. F., 1974, "Acoustic waves from an impulsive source in a fluid-filled borehole," J. Acoust. Soc. Am., 55, pp. 1144-1157.

Miller, D., Oristaglio, M., and Beylkin, G., 1987, "A new slant of seismic imaging: Migration and integral geometry," Geophysics, 52, pp. 943-964.

* cited by examiner

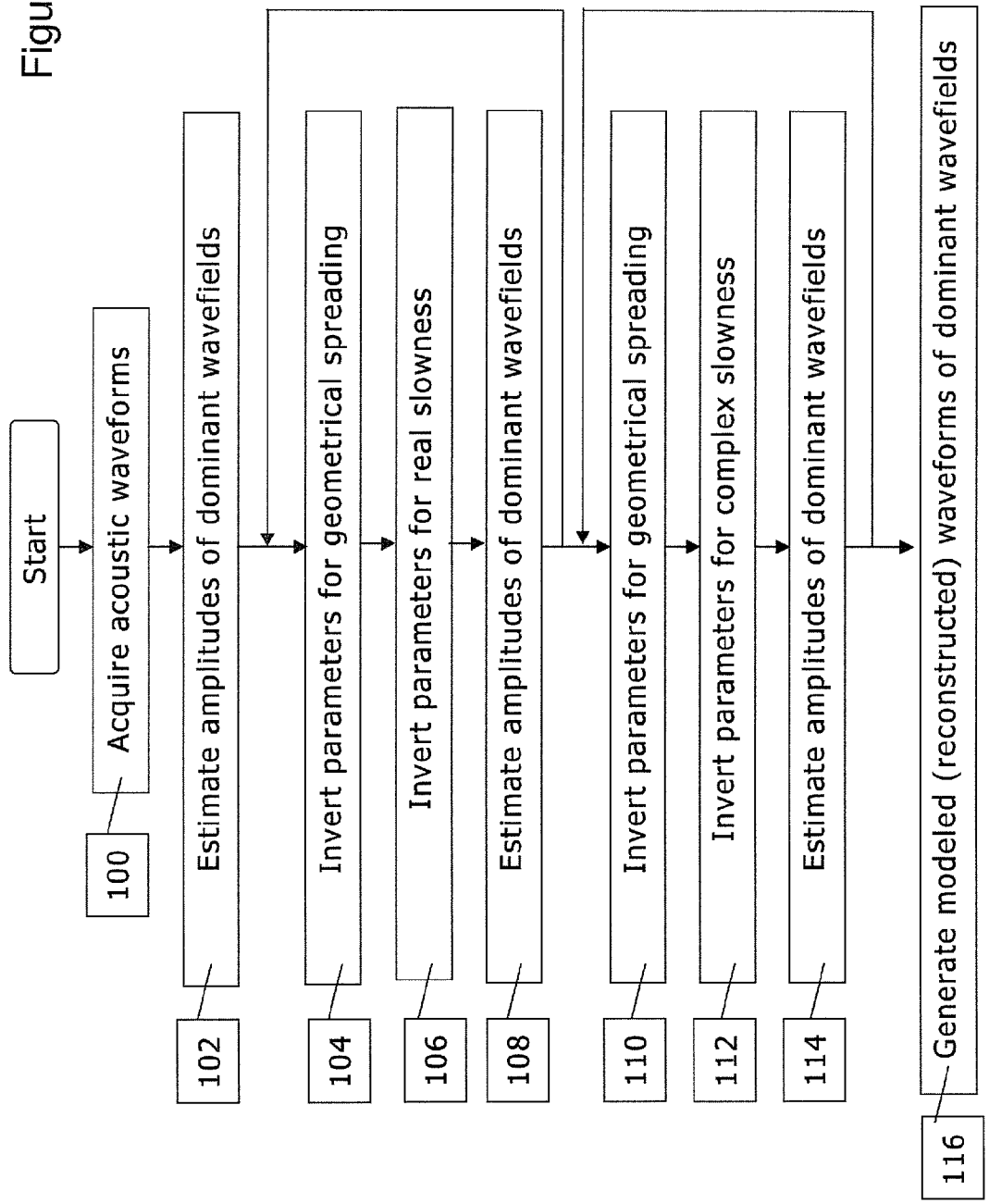

Example 1: Input and decomposed waveforms (a) Input waveforms
(b) P-waves
(c) S-waves
(d) Stoneley waves Example 1: Wavefields separation (a) Raw waveforms
(b) Reconstructed waveforms
(c) Residual waveforms (reflections)

← PrP Event
← SrS Event

Example 1: Input and decomposed waveforms (a) Input waveforms
(b) P-waves
(c) S-waves
(d) Stoneley waves Example 1: Wavefields separation (a) Raw waveforms
(b) Reconstructed waveforms
(c) Residual waveforms (reflections)

← PrP Event
← SrS Event

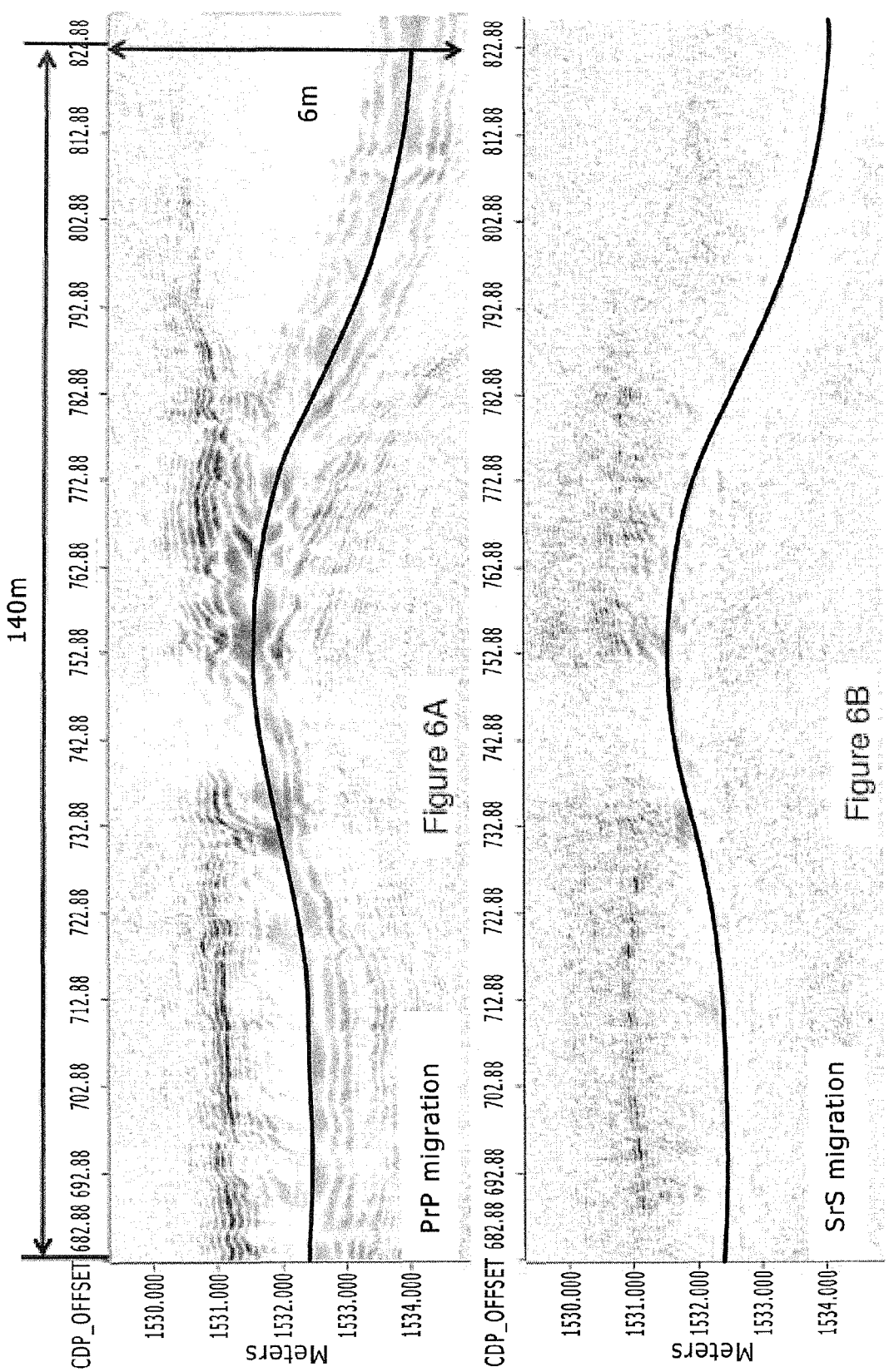
Figure 6A PrP migration
Figure 6B SrS migration

METHODS AND SYSTEMS FOR PROCESSING ACOUSTIC WAVEFORM DATA

RELATED APPLICATIONS

This application claims priority of U.S. Provisional Patent Application Ser. No. 60/043,401, filed 9 Apr. 2008, the entire contents of which are incorporated herein by reference.

FIELD

The present invention relates generally to methods and systems for investigating subsurface formations using acoustic measurements made in a borehole. More particularly, the present disclosure is directed to methods and systems that provide improved processing of acoustic waveform data for purposes of characterizing subsurface formations.

BACKGROUND

Acoustic measurements using currently available tools and methods provide key information in oilfield borehole logging. The currently available acoustic tools are useful in providing a wide range of information regarding the surrounding formation and the borehole parameters. Surface seismic and vertical seismic profiling (VSP) methods are utilized to provide imaging of the overall geological structure of a hydrocarbon reservoir. Sonic and other well logging methods provide good resolution imaging in the immediate vicinity of the borehole. Sonic imaging is yet another technique that bridges the gap in spatial resolution between these seismic and well logging methods.

Some tools include a single source of sonic waves and two or more receivers, however, most of the tools now include two or more acoustic sources and many receivers arranged in an array. A primary use of acoustic borehole measurements is the estimation of compressional (P) wave and/or shear (S) wave formation slowness. The estimation of compressional and/or shear wave formation slowness is often expressed as an S-T (slowness vs. time) plane, and can be visualized at the wellsite with current technology.

While sonic imaging generally has been successful, waveform data acquired for sonic imaging purposes typically contain many types of arrivals in addition to the desired reflected arrivals, such as tool-borne noise and borehole-borne noise. For example, direct compressional and shear headwaves and tube waves, which are a part of the raw data that are acquired during downhole acoustic measurements, tend to obscure the reflected arrival waves relating to acoustic reflectors in subterranean formations.

The assignee of the present application, Schlumberger, has developed a wireline sonic imaging tool (referred to as the Borehole Acoustic Reflection Survey (BARS) tool) that allows reservoir features such as reflectors and fractures to be imaged.

Borehole acoustic reflection surveys are performed, for example, for the characterization of local geology, validation of geo-steering, and detection of fractures. The acquired sonic waveforms are processed and migrated to obtain images up to about 10 to 20 meters away from the borehole. In this, it is desirable to have improved techniques for modeling the dominant wavefields, such as the direct compressional, shear and Stoneley waves, for example, so that they may be removed, making subsurface imaging and characterization efficient and reliable.

Typically, in sonic data processing the reflected (p-to-p, p-to-s and s-to-p) and refracted (p-to-s and s-to-p) waves are usually weak compared to the direct compressional, shear and Stoneley waves. One important aspect of sonic data processing involves the efficient separation of wavefields to reliably extract the reflected and refracted signals. Known techniques for wavefield separation include the adaptive interference canceller (AIC) filter and median velocity filters in common offset gathers, i.e., gathers of traces recorded by common receiver stations of the sonic array tool. However, in typical sonic data processing to extract the reflected and refracted signals event signals whose apparent velocity is slower than the direct P-waves may be removed and the amplitudes, especially for events from layers which are parallel to the well, tend to become weaker. Therefore, it is also desirable to have techniques for modeling the dominant wavefields with greater precision so that extraction of the reflected and refracted wavefields conserves amplitudes of event signals.

The limitations of conventional data processing noted in the preceding are not intended to be exhaustive but rather are among many which may reduce the effectiveness of previously known techniques. The above should be sufficient, however, to demonstrate that acoustic data processing techniques existing in the past will admit to worthwhile improvement.

SUMMARY

The present invention meets the above-described needs and others. Specifically, the present disclosure provides methods and systems for taking acoustic measurements relating to subterranean formations, and, in particular, for logging subterranean formations.

The present applicants recognized that sonic data have characteristic properties such as amplitude variations due to geometrical spreading, dispersion, and attenuation. Such amplitude variations within an array may be significant and could be utilized for purposes of improved, efficient modeling of dominant waveforms in acoustic data measurements.

The present applicants further recognized that it is possible to adapt and apply wavefield separation techniques using parametric inversion for purposes of sonic data processing. Applicants further recognized that in sonic data processing the dominant waves to be modeled and removed are three, viz., P-, S- and Stoneley. All three waves have the same sign of moveout and the input data are not multi-component. Additionally, amplitude variations within the array are significant and the waves may be dispersive.

Applicants have developed novel and improved data processing techniques that are applicable to acoustic logging data, for example, sonic logging data, and overcome, or at least reduce the effects of, one or more of the problems outlined above.

Accordingly, an object of the present disclosure is to provide improved systems and methods for processing acoustic waveform data acquired in a borehole in which the dominant waves are accurately and precisely modeled. A further object of certain embodiments herein is to provide improved systems and methods so that reflected and refracted arrival waves are easily identified and selected from tool-borne and borehole-borne arrivals. A further object of certain embodiments herein is to provide methods and systems for characterizing subsurface formations, validating geo-steering, identifying fractures, among other applications, using sonic waveform data acquired in a borehole to derive novel and improved results relating to the subsurface formations.

In one aspect of the present disclosure, a method of processing acoustic waveform data relating to a subterranean formation is provided. The method comprises taking acoustic measurements at one or more depths of a borehole traversing a subterranean formation; deriving slowness of the formation based on wavefields in the acoustic measurements; and modeling dominant wavefields in the acoustic measurements based on the formation slowness, wherein deriving the formation slowness comprises parametric inversion for complex and frequency dependent slowness. The derived slowness is complex, having real and imaginary parts. The dominant wavefields in the acoustic measurements comprise compressional, shear, Stoneley and casing mode waveforms.

In certain embodiments herein, the method comprises decomposing the dominant wavefields in the acoustic measurements. In other embodiments, the method comprises deriving geometrical spreading of direct compressional and shear waveforms in the acoustic measurements. In further embodiments of the present disclosure, the geometrical spreading of the direct compressional and shear waveforms is derived before deriving slowness of the formation.

Aspects of the present disclosure provide iteratively minimizing misfit between input and modeled waveforms. In certain embodiments, the misfit between input and modeled waveforms is minimized by determining a set of geometrical spreading and slowness parameters that minimize the misfit. Dominant wavefields are generated based on the set of geometrical spreading and slowness parameters. Further aspects herein provide subtracting the dominant wavefields from the input waveforms and extracting event signals from the acoustic measurements comprising reflected and/or refracted waveforms.

In some embodiments, a method of processing acoustic waveform data comprises deriving attenuation parameter Q for the subterranean formation. In other embodiments, a method of processing acoustic waveform data comprises analyzing dispersion of Stoneley waveforms for the subterranean formation.

In aspects of the present disclosure, the measurements taken may be sonic measurements. In other aspects, the measurements taken may be logging measurements. In yet other aspects, the measurements taken may be while-drilling measurements. In further aspects herein, the measurements taken may be borehole acoustic reflection survey measurements.

Aspects of the present disclosure provide iteratively minimizing misfit between input and modeled waveforms; subtracting the modeled waveforms from the input waveforms; extracting event signals from the acoustic measurements comprising reflected and/or refracted waveforms; and generating, in real-time with the acoustic measurements, an indication or imaging of acoustic reflectors in the formation.

A method of logging a subterranean formation is provided comprising generating acoustic waves with a source; receiving acoustic waveforms with a plurality of receivers; deriving slowness of the formation based on the acoustic waveforms; modeling dominant waveforms in the acoustic waveforms based on the formation slowness, wherein deriving the formation slowness comprises parametric inversion for complex and frequency dependent slowness and the derived complex slowness has real and imaginary parts; iteratively minimizing misfit between input and modeled waveforms; subtracting the modeled waveforms from the input waveforms; and extracting event signals from the acoustic waveforms comprising reflected and/or refracted waveforms. In aspects herein, the method of logging a subterranean formation further comprises providing at a wellsite, in real-time with receiving acoustic waveforms, an indication or imaging of acoustic reflectors in the formation; and utilizing the indication or imaging of acoustic reflectors for adjusting parameters of the subterranean logging. The indication or imaging of acoustic reflectors in the formation may be utilized for validation of geo-steering parameters.

A system for taking sonic measurements relating to a subterranean formation is provided. The system comprises an acoustic tool comprising at least one source and a plurality of receivers mounted thereon; a computer in communication with the acoustic tool; and a set of instructions executable by the computer that, when executed, receive acoustic waveforms with the plurality of receivers; derive slowness of the formation based on the acoustic waveforms; model dominant waveforms in the acoustic waveforms based on the formation slowness, wherein deriving the formation slowness comprises parametric inversion for complex and frequency dependent slowness and the derived complex slowness has real and imaginary parts; iteratively minimize misfit between input and modeled waveforms; subtract the modeled waveforms from the input waveforms; and extract event signals from the acoustic waveforms comprising reflected and/or refracted waveforms.

Additional advantages and novel features will be set forth in the description which follows or may be learned by those skilled in the art through reading these materials or practicing the invention. The advantages may be achieved through the means recited in the attached claims.

BRIEF DESCRIPTION OF THE DRAWINGS

The accompanying drawings illustrate certain embodiments and are a part of the specification. Together with the following description, the drawings demonstrate and explain some of the principles of the present invention.

FIG. 1A is a flowchart illustrating one possible acoustic data processing technique according to the description herein.

FIGS. 6A and 6B show migration images derived using typical acoustic data processing (FIG. 6A) and acoustic data processing according to the disclosure herein (FIG. 6B).

Figure 1B:
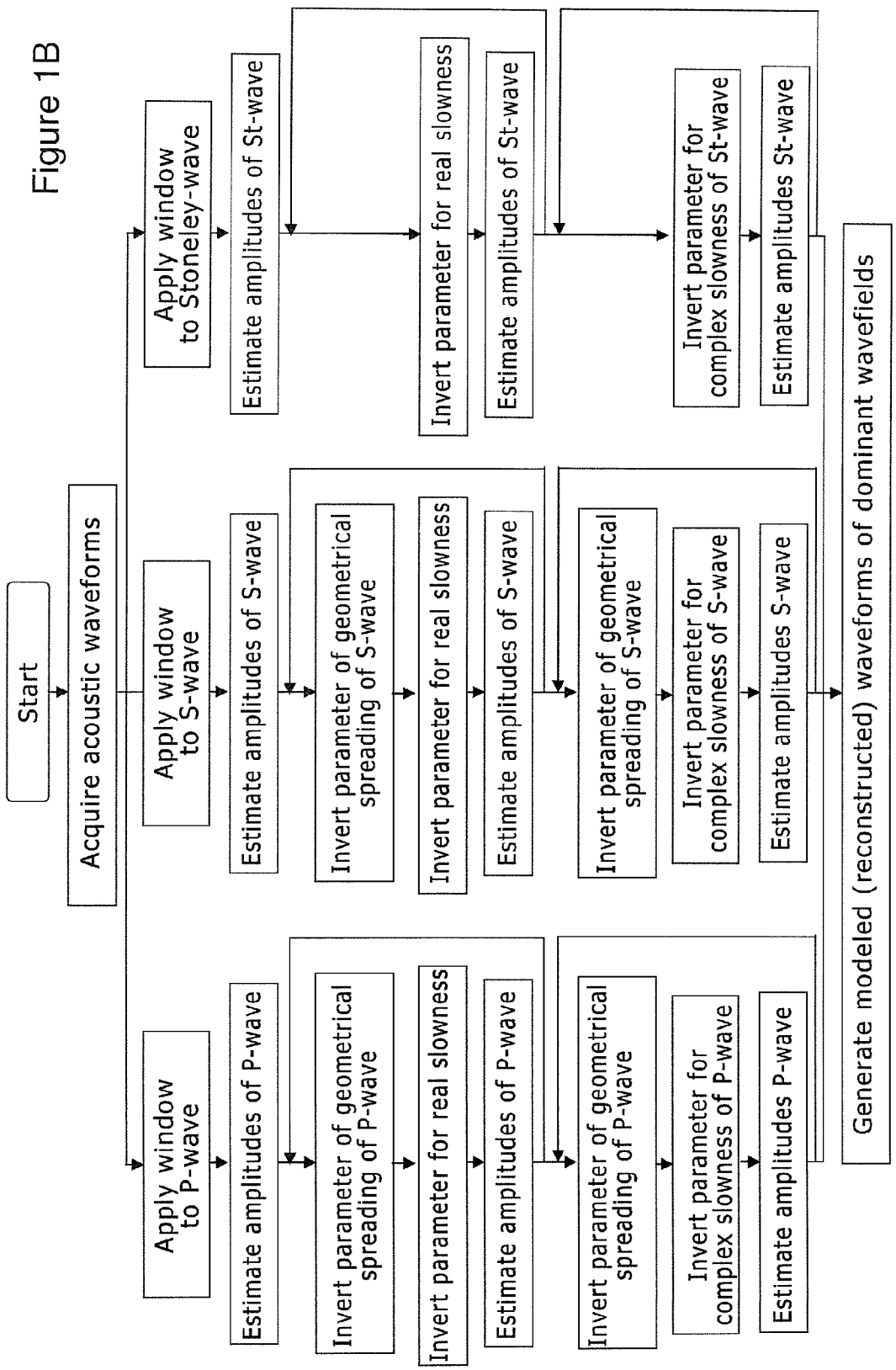
FIG. 1B is a flowchart depiction of another possible acoustic data processing technique according to the description herein.

Throughout the drawings, identical reference numbers and descriptions indicate similar, but not necessarily identical, elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Turning now to the drawings, wherein like numerals indicate like parts, the disclosure herein is directed to the concept of various techniques that may be utilized to facilitate and improve acoustic data processing, and the characterization of subsurface formations based on results that are derived from the improved data processing. The present disclosure contemplates applicability of the disclosed techniques to sonic data that are acquired in, for example, sonic logging operations for purposes of characterization and monitoring of underground reservoirs. The acoustic data may be acquired in exploration and/or production wells. The present disclosure further contemplates application of the disclosed techniques to single well seismic measurements.

The methods and systems may be applied to acoustic wellbore logging with a wireline logging tool. However, the methods and systems presented herein are not so limited. For example, the methods and systems may be applied to other applications such as logging while drilling (LWD), measurement while drilling (MWD), production logging. The present disclosure contemplates the use of the methods and systems herein in combination with various acoustic measurements, for example, with other seismic logging operations.

As described in greater detail below, the present disclosure provides various techniques which may be used to facilitate and improve wavefield estimation and separation. In one aspect of the present disclosure, wavefields recorded by an array of receivers are assumed to be expressed by the phase shift due to the difference of arrival times and a function of geometrical spreading. The wavefields are decomposed as estimated amplitudes of angular frequency components. In further aspects herein, acoustic data are reconstructed using the estimated amplitudes, which contain the decomposed wavefields. If the decomposed wavefields are accurate extractions, reflected and refracted event signals are separated out by subtraction of the reconstructed data from the input data.

Applicants discovered that novel and improved results are obtained when parameters of geometrical spreading and complex-valued slowness of the direct compressional, shear and Stoneley waves are inverted by minimizing the errors between the input and reconstructed waveforms. Aspects of the present disclosure teach that the inverted results may be used for purposes of parametric wavefield decomposition and reconstruction of waveforms using, for example, the three wavefields.

The present disclosure also contemplates reconstruction of casing mode waveforms. In this, casing modes contain the P-, S- and Stoneley waves that are characterized by the P- and S-slowness of the casing.

In further aspects, reconstructed waveforms may be subtracted from the input waveforms, and signals of reflected or refracted events may be separated out. Residuals in the separated waveforms may be removed further by median filters using the estimated apparent velocities.

The present disclosure contemplates sonic data processing to derive reconstructed dominant wavefields. Further, precise estimation of the dominant wavefields provides the capability for reliable and efficient wavefield separation of reflected and/or refracted waveforms. In addition, inverting for slowness according to the techniques of the present disclosure provides enhanced answer products, such as quality factor Q and dispersion analysis of Stoneley waves.

As mentioned above, in the past acoustic reflectors extracted from data acquired during a logging operation could be compromised by subtracting estimates of the dominant waveforms that under certain circumstances could be inaccurate or imprecise.

The present applicants recognized that sonic data have characteristic properties such as amplitude variations due to geometrical spreading, dispersion, and attenuation. Such amplitude variations within an array may be significant and could be utilized for purposes of improved, efficient modeling of dominant waveforms in acoustic data measurements for characterization of subsurface formations, validation of geo-steering, identification of fractures, among other applications that are known to those skilled in the art.

Figure 7:
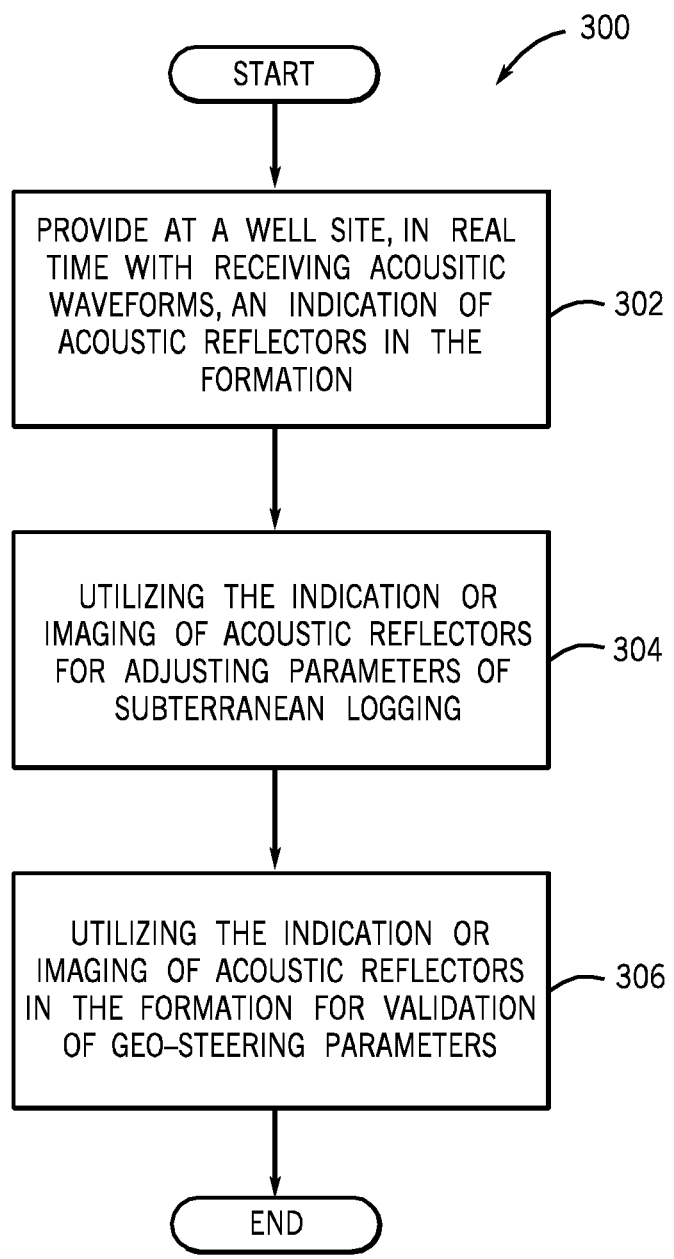
FIG. 7 is a flow diagram depicting a technique to validate geo-steering parameters.

Thus, referring to FIG. 7, a technique 300 includes providing (block 302) at a wellsite, in real-time with receiving acoustic waveforms, an indication or imaging of acoustic reflectors in the formation; utilizing (block 304) the indication or imaging of acoustic reflectors for adjusting parameters of the subterranean logging; and utilizing (block 306) the indication or imaging of acoustic reflectors in the formation for validation of geo-steering parameters.

The applicants have proposed a novel technique in which direct P-, S- and Stoneley waves are decomposed. In one embodiment of the present disclosure, a geometrical spreading function may be utilized to solve parameters for direct P- and S-waves. The present disclosure contemplates parametric inversions for both real and frequency independent parameters, i.e., non-dispersive, and complex and frequency dependent slowness, i.e., dispersive.

In order to gain a better understanding of the various techniques and features described in this application, a brief description of the disclosed techniques will now be provided. The present disclosure provides methods and systems for wavefield separation using parametric inversion and decomposition for data acquired, for example, in a borehole acoustic survey. Parameters describing the propagation along the wellbore of compressional, shear, and Stoneley waves are estimated, including geometrical spreading and complex-valued velocities. The maximum portion of the measured wavefields, compatible with the estimated parameters, are identified and subtracted. A further attenuation of the direct waves is obtained using median filters along the estimated propagation velocities. After the direct waves are removed, a relatively larger presence remains of components of the wavefield that are possibly reflected in the formation. Applicants conducted tests, as described in further details hereinafter, to confirm the effectiveness of the techniques by application to real field data.

In some embodiments of the present disclosure, assuming each wavefield can be expressed by a phase shift in the frequency domain due to the differences in arrival times and a function of geometrical spreading, the parametric decomposition is expressed as:

$$\begin{pmatrix} g_1(z_1)e^{-i\omega z_1 s_1} & \cdots & g_N(z_1)e^{-i\omega z_1 s_N} \\ \vdots & \ddots & \vdots \\ g_1(z_M)e^{-i\omega z_M s_1} & \cdots & g_N(z_M)e^{-i\omega z_M s_N} \end{pmatrix} \begin{pmatrix} a_1(\omega) \\ \vdots \\ a_N(\omega) \end{pmatrix} = \begin{pmatrix} d_1(\omega) \\ \vdots \\ d_M(\omega) \end{pmatrix}$$

where
$z_j$: Distance from source to j-th receiver
$g_k(z)$: Function of geometrical spreading
$s_k$: Slowness of k-th plane wave
$a_k$: Estimated amplitudes of k-th plane wave
$d_j$: Data recorded by j-th receiver
N: Number of wavefields
M: Number of receivers Geometrical spreading is derived for P- and S-waves (it is constant for Stoneley waves) in one embodiment of the present disclosure by inversion:
$g_k(z)$: Function of geometrical spreading $$g_k(z) = (1 + c_k(z - z_{min}))^{-1} \quad \text{Equation 2}$$

$c_k$: Real-valued parameter to be solved for
where c=0 is fixed for the Stoneley wave.

The present disclosure also contemplates use of a geometrical spreading function such as:

$$g_P(z) = (\bar{z} \log^2 \bar{z})^{-1} \text{ (for P-waves)}$$

$$g_S(z) = \bar{z}^{-2} \text{ (for S-waves)} \quad \text{Equation 3}$$

where $\bar{z} = z/R$ and R is borehole radius
Amplitudes may be estimated by:
Denote equation by matrix and vector form $$Gm = d$$

where
G: Matrix of propagator along borehole
m: Vector of estimated amplitudes
d: Vector of input data Equation is solved in least squares sense $$m = (G^+G + \epsilon I)^{-1} G^+ d \quad \text{Equation 4}$$

where
$G^+$: Transposed complex conjugate of G
I: Identity matrix
$\epsilon$: Damping parameter The present disclosure contemplates parametric inversion of dispersive (complex) equations:
Equation to be solved is $$\hat{d} - d = 0$$

where $\hat{d}$ is vector of reconstructed waveforms given by
$\hat{d} = Gm$.
Using Taylor's expansions $$H \delta p = (\hat{d} - d) \quad \text{Equation 5}$$

where
$\delta p$: Perturbation vector whose components are perturbation of $p_j$, $$H_{ij} = \frac{\partial \hat{d}_i}{\partial p_j}.$$

Equation is solved in least squares sense as $$\delta p = -(H^+ H + \epsilon I)^{-1} H^+ (\hat{d} - d)$$

The present disclosure also provides parametric inversion of non-dispersive (real) equations:
Vector of reconstructed waveforms $\hat{d}$ is given by $$\hat{d} = Gm.$$

Misfit between data and reconstructed waveforms is given by $$E = (\hat{d} - d)^+ (\hat{d} - d) \quad \text{Equation 6}$$

where + shows transpose of complex conjugate matrix
Following equation holds for the optimum values of parameters $$\left(\frac{\partial}{\partial p_j} \hat{d}\right)^+ (\hat{d} - d) + (\hat{d} - d)^+ \frac{\partial}{\partial p_j} \hat{d} = 0, (j = 1, \ldots, N)$$

where summation is taken for frequencies.

After shifting the waveforms by times appropriate for each of the three dominant direct waves—compressional, shear and Stoneley—a spatial median filter is used to remove residuals effectively left by the processing discussed above.

The present disclosure provides inverting for slowness according to the techniques herein to derive quality factor Q as follows:

$$Q = \frac{1}{2} \frac{\text{Re}(S_k)}{\text{Im}(S_k)} \quad \text{Equation 7}$$

where $\text{Re}(S_k)$ and $\text{Im}(S_k)$ are real and imaginary parts of complex slowness, $S_k$, respectively.

Figure 1C:
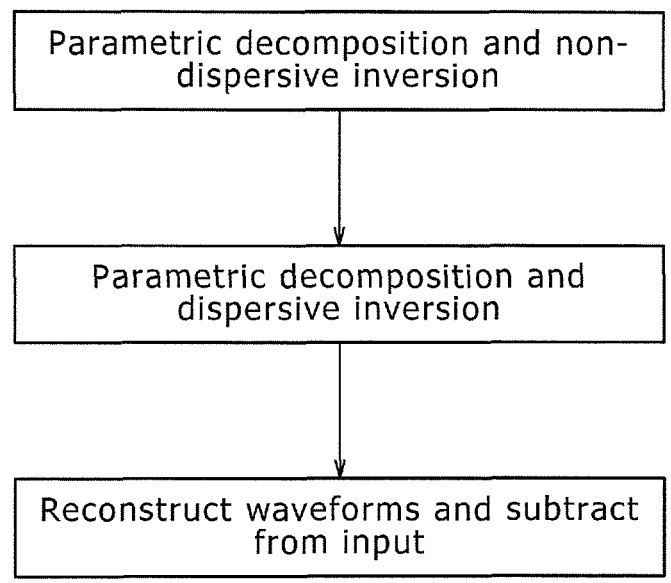
FIG. 1C is a flowchart depiction of yet another possible acoustic data processing technique according to the description herein.

FIGS. 1A-1C are flowcharts illustrating some possible acoustic data processing techniques according to the description herein.

Referring to FIG. 1A, acoustic waveform data are acquired at each depth 100. In the processing workflow of FIG. 1A, the amplitudes of dominant wavefields are estimated (102); parameters for geometrical spreading are inverted (104);

parameters for real slowness are inverted (106); and amplitudes of dominant wavefields are estimated (108). The processing may be iterated by looping to minimize misfit between input and modeled waveforms (note Equation 6 above).

Referring again to FIG. 1A, parameters for geometrical spreading are inverted (110); parameters for complex slowness are inverted (112); and amplitudes of dominant wavefields are estimated (114). The processing may be iterated by looping to minimize misfit between input and modeled waveforms (note Equation 6 above). Modeled i.e., reconstructed waveforms of dominant wavefields are generated (116).

In the processing workflow of FIG. 1A, with the geometrical spreading parameter and slowness parameter for each of the dominant wavefields, modeled waveforms can be computed. The modeled waveforms are compared to the input waveforms, and the geometrical spreading and slowness parameters are varied until the misfit between the modeled and input waveforms reaches a minimum. For the set of geometrical spreading and slowness parameters that minimize the misfit, the dominant wavefields are generated.

FIGS. 1B and 1C depict yet other possible acoustic data processing techniques according to the description herein.

In the processing workflow of FIG. 1B, the processing may be iterated by looping to minimize misfit between input and modeled waveforms (note again Equation 6 above). In one possible embodiment of the present disclosure, the reconstructed dominant waveforms may be subtracted from the input waveforms to generate reflected and/or refracted waveforms in the acquired acoustic data (note FIG. 1C).

As described in further detail below, the techniques illustrated in the flowcharts of FIGS. 1A-1C provide efficient, real-time indicators of possible acoustic reflectors in subsurface formations.

Figure 2A:
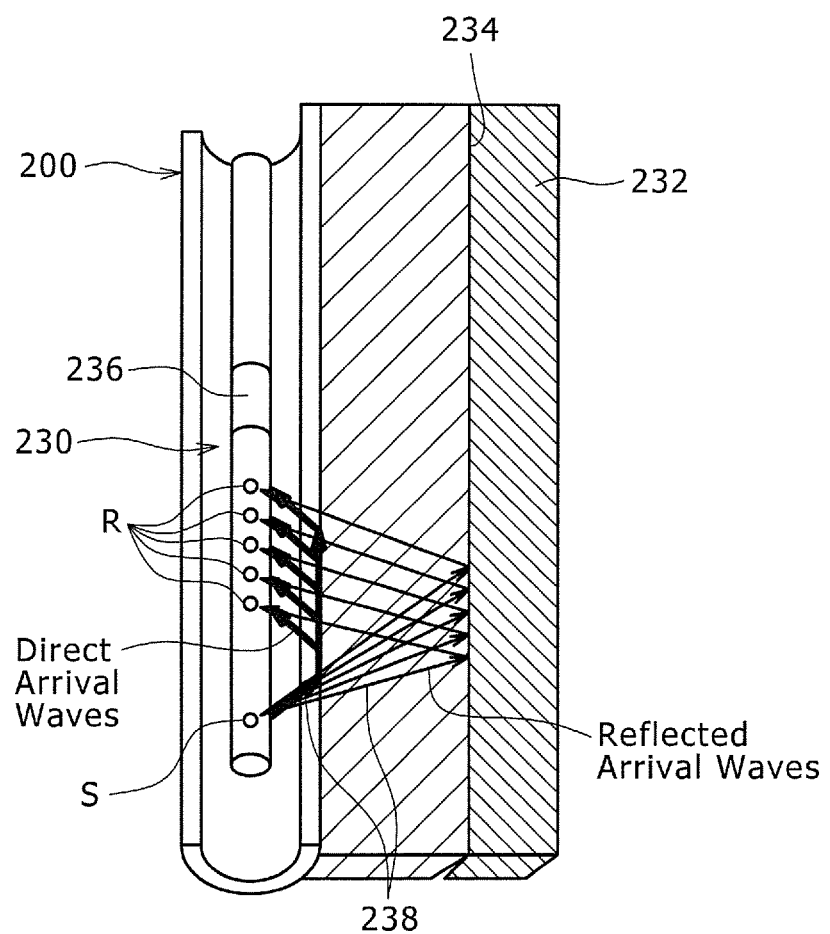
FIG. 2A depicts one possible tool configuration for practicing the techniques of the present disclosure.

FIG. 2A illustrates one possible tool configuration 230 for practicing the techniques of the present disclosure.

Referring to FIG. 2A, one exemplary configuration of a transmitter S and a receiver array R spaced from the transmitter S is provided to illustrate one possible arrangement for acquiring acoustic data in a borehole 200. As shown by the darker arrowhead lines of FIG. 2A, some acoustic waves 238 from the transmitter S propagate along borehole 200 and then arrive directly at the set of receivers R. Also, some acoustic waves 238 from the transmitter S propagate, as shown by the lighter arrowhead lines of FIG. 2A, to each receiver R after returning from a reflector 234 in a formation 232.

Figure 2B:
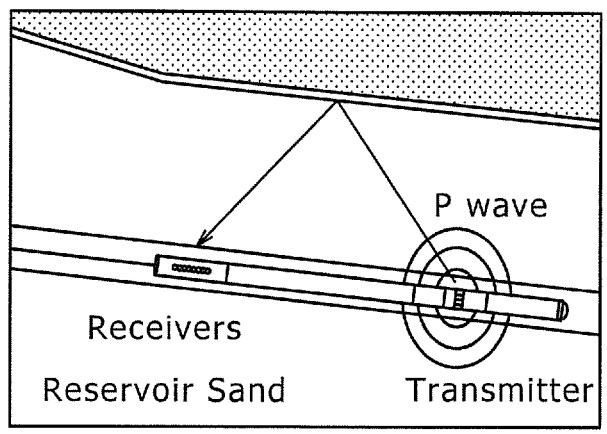
FIG. 2B illustrates one possible context for a borehole acoustic reflection survey utilizing an array tool.
Figure 2C:
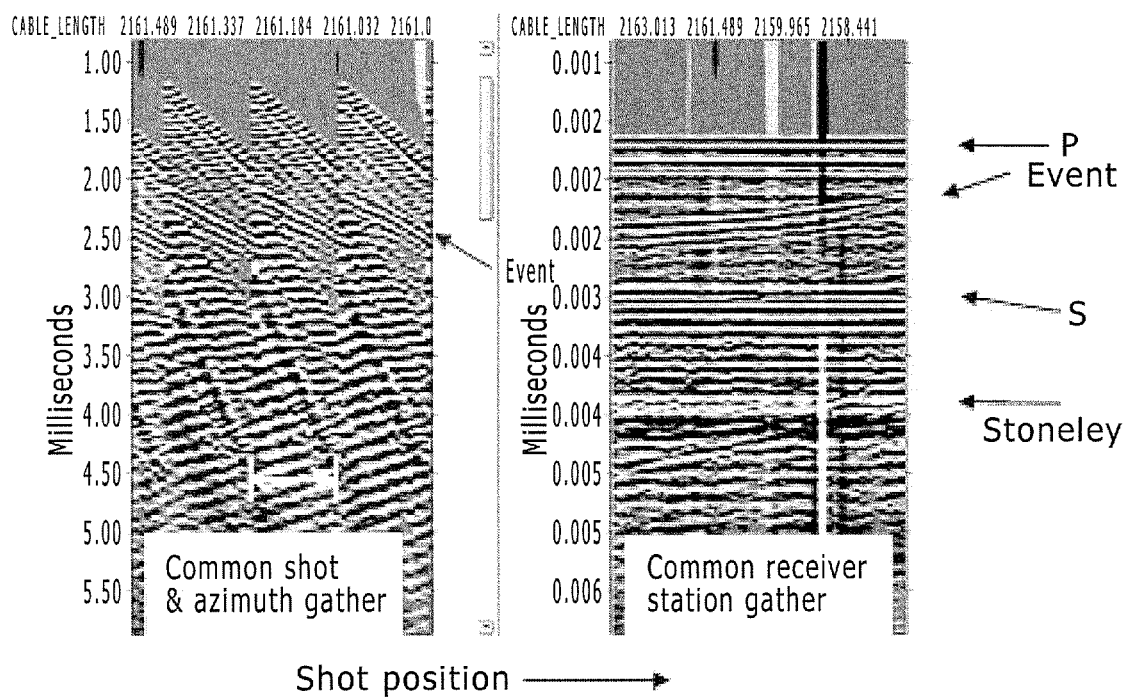
FIG. 2C depicts exemplary sonic waveforms to illustrate the relative strengths of borehole modes (P, S and Stoneley) and event signals.

FIG. 2B is a schematic illustration of an exemplary borehole acoustic reflection survey. In the exemplary sonic waveforms of FIG. 2C, it is evident that borehole modes (P, S and Stoneley) are dominant over event signals.

An array tool of a sonic logging system may be used for the acquisition of acoustic data. In this, recording time may be set to be sufficiently long to record the reflected waves. FIG. 2B shows one possible example in which the acoustic tool is in subterranean reservoir sand, and reflection wavefields come from shale cap rock. However, the methods and systems presented herein are not so limited and other scenarios also are possible.

The principles described herein may be applied to various types of data acquisition systems, such as wireline measurements, drilling measurements, production measurements, and so on.

The techniques described above may be used with logging tools and systems of any type. For example, referring again to FIG. 2A, the exemplary sonic tool 230 is shown adjacent to the formation 232 with acoustic reflector 234. The sonic tool 230 includes the source S, and at least one sensor or receiver R. In the exemplary embodiment shown in FIG. 2A, there are multiple receivers. The source/receiver arrangement shown is exemplary in nature and there may be any arrangement of receivers and/or sources.

As one possibility, Schlumberger's wireline sonic imaging tool referred to as the Borehole Acoustic Reflection Survey (BARS) tool may be utilized for the purposes described herein.

The receivers R and source S are coupled to a computer processor (generally designated as 236 in FIG. 2A) for collecting and processing data from the sonic tool 230. Also shown is a wave ray path 238 representing a path for a wave caused by activation of the source S. The receivers R may be of different types, including, but not limited to, piezoelectric and magneto-restrictive receivers. The receivers R are able to detect the arrival of sonic waves; direct arrival waves and reflected and/or refracted arrival waves as depicted in FIG. 2A.

Measurements collected from the sonic tool 230, which may include waveforms generated by the receivers R over time, may be sent to the surface via a cable (not shown) from which the sonic tool is suspended or by any other convenient communication technique (e.g., mud telemetry or wired drill-pipe). The computer processor 236 is commercially available from a wide variety of sources. The sonic data taken by the sonic tool 230 and received by the computer processor 236 (in-situ or at the surface) may be processed according to instructions accessible to the computer processor 236 to perform the processing described above. The imaging of acoustic reflectors may be performed at the wellsite, although in other embodiments described herein computations may be done at an off-site processing location using the sonic data collected by the sonic tool.

Figure 3A:
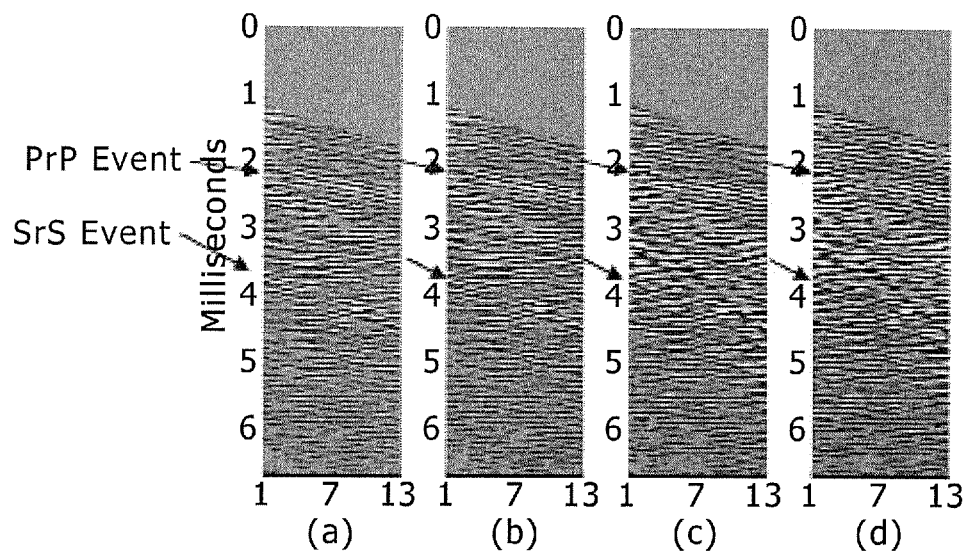
FIG. 3A is a side-by-side depiction of results using different acoustic data processing techniques according to the present disclosure compared with conventional acoustic data processing.

FIG. 3A depicts the results of various acoustic data processing techniques according to the present disclosure compared with conventional acoustic data processing. The waveforms of FIG. 3A were derived using real data. Waveforms (a) of FIG. 3A were derived using inversion for geometrical spreading and dispersive and non-dispersive inversion according to the techniques described herein. Waveforms (b) of FIG. 3A were derived using the Roever et al. function (Roever, W. L., Rosenbaum, J. H., and Vining, T. F., 1974, Acoustic waves from an impulsive source in a fluid-filled borehole, J. Acoust. Soc. Am., 55, 1144-1157) for geometrical spreading and dispersive and non-dispersive inversion according to the techniques described herein. Waveforms (c) of FIG. 3A were derived using inversion for geometrical spreading and non-dispersive inversion according to the techniques described herein; dispersive inversion was not applied. Waveforms (d) of FIG. 3A were derived using conventional data processing techniques in which amplitudes were estimated using input slowness; inversion for geometrical spreading and dispersive and non-dispersive inversion according to the techniques described herein were not applied.

Figure 3B:
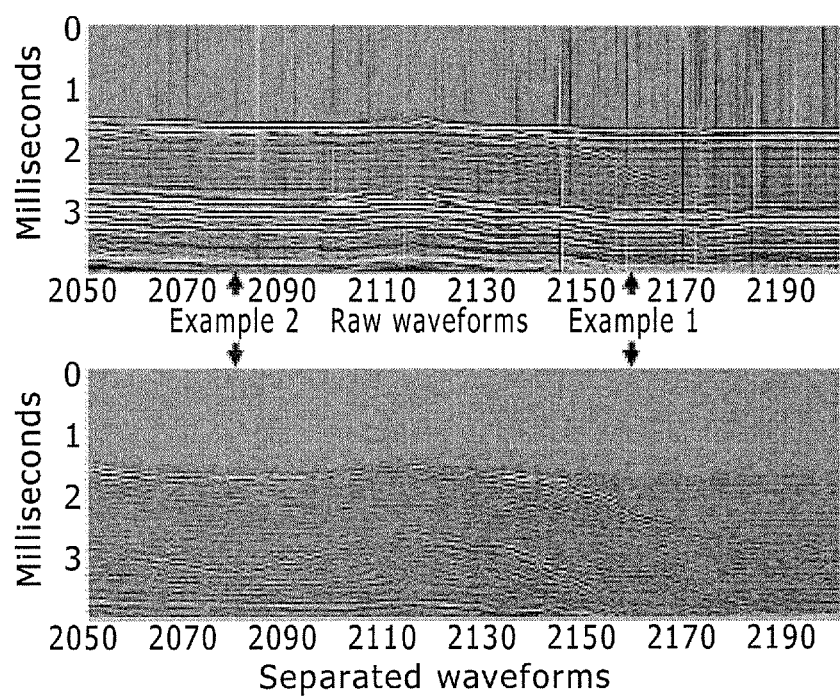
FIG. 3B depicts a comparison of raw input waveforms acquired by a common receiver station and the results using one possible acoustic data processing technique according to the present disclosure (also shown in waveform plot (a) of FIG. 3A).

FIG. 3B depicts the results of the processing of waveforms (a) in FIG. 3A. Raw input waveforms acquired by a common receiver station are compared with the separated waveforms (a) of FIG. 3A that were derived using one possible acoustic data processing technique according to the present disclosure.

Figure 4A:
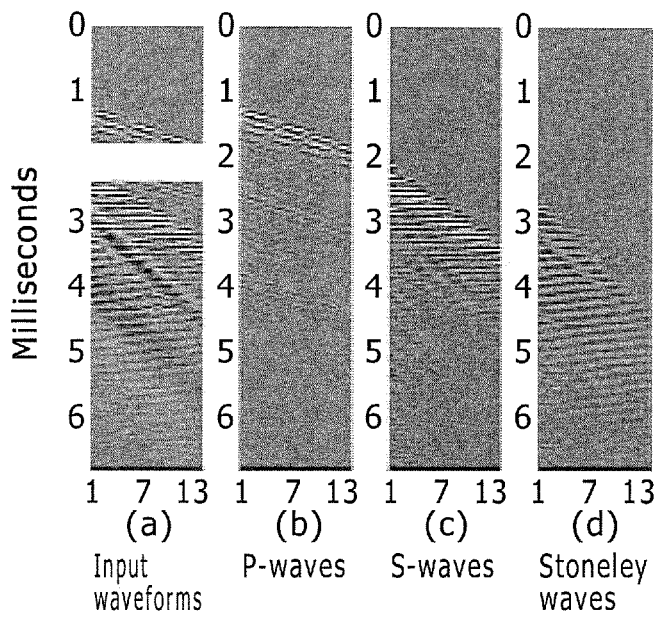
FIG. 4A depicts one example of input and decomposed dominant waveforms.
Figure 4B:
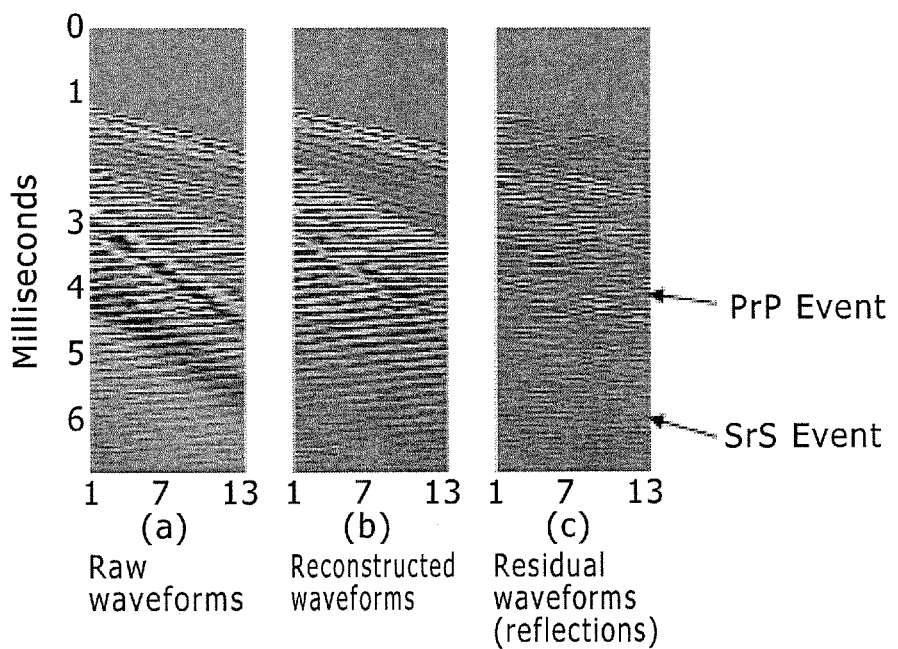
FIG. 4B depicts one example of reconstructed dominant waveforms and wavefield separation according to the techniques described herein.
Figure 5A:
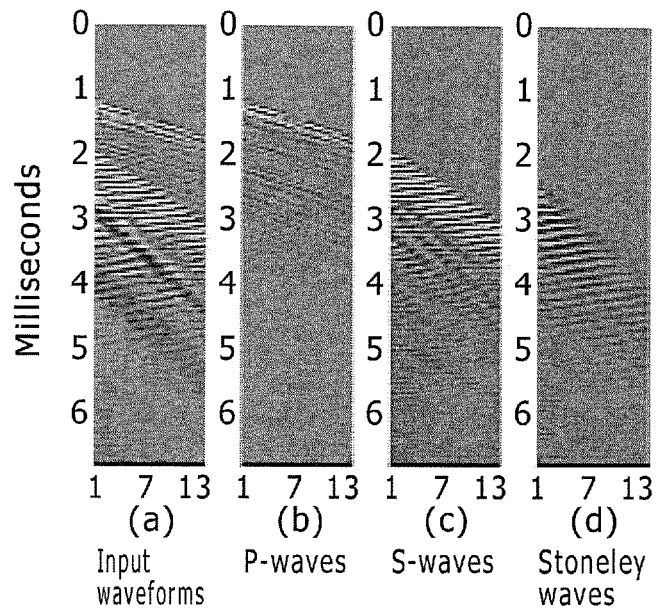
FIG. 5A depicts another example of input and decomposed dominant waveforms.

FIG. 4A depicts one example of input and decomposed dominant waveforms and FIG. 4B depicts one example of reconstructed dominant waveforms and wavefield separation according to the techniques described herein. FIG. 5A depicts another example of input and decomposed dominant waveforms and FIG. 5B depicts another example of reconstructed dominant waveforms and wavefield separation according to the techniques described herein.

Figure 5B:
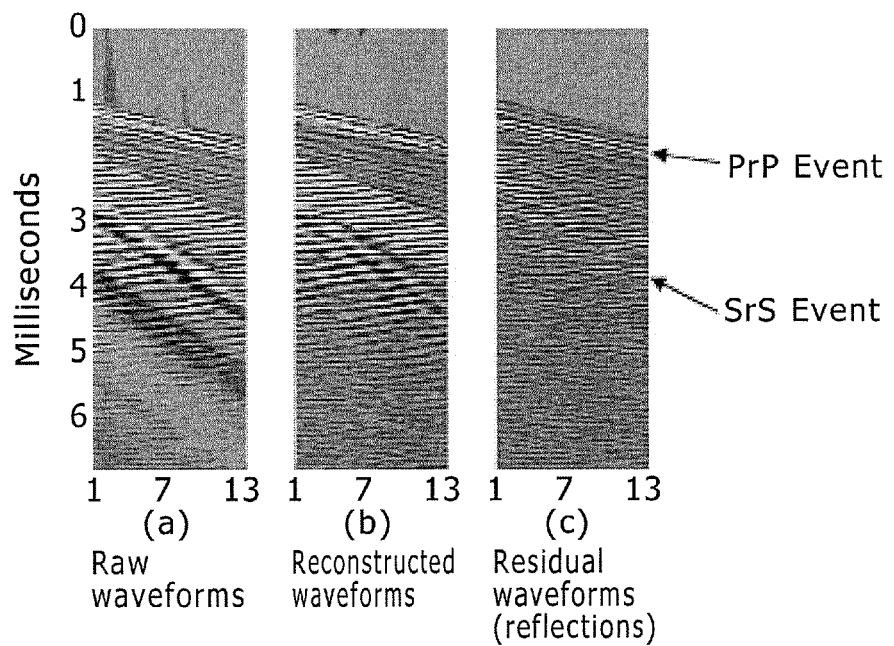
FIG. 5B depicts another example of reconstructed dominant waveforms and wavefield separation according to the techniques described herein.

In FIGS. 4A and 4B and FIGS. 5A and 5B, real waveform data are provided that were acquired at different measurement points using the same tool in the same well. It is noted that FIGS. 5A and 5B show that although the event signals are close to direct compressional waveforms, separation is possible using the techniques of the present disclosure. It is also noted that the decomposed waveforms of FIGS. 4A and 5A match the reconstructed waveforms of FIGS. 4B and 5B thereby validating the efficacy and reliability of the techniques disclosed herein.

FIGS. 6A and 6B show migration images derived using typical acoustic data processing (FIG. 6A) and acoustic data processing according to the disclosure herein (FIG. 6B).

In one example of application of the acoustic data processing techniques of the present disclosure, Generalized Radon Transform migration (Miller, D., Oristaglio, M., and Beylkin, G., 1987, A new slant of seismic imaging: Migration and integral geometry, Geophysics, 52, 943-964) was used for PrP (P-reflected-P) and SrS (S-reflected-S) waves. Waveforms that were separated and processed using semblance weighted deconvolution (SWD) were used as input waveforms. 1-D velocity model (no dip) was created from inverted slowness by parametric inversion. The migration options were 0 degree dip and 60 degree aperture. The results are depicted in FIG. 6B.

As mentioned above, according to some aspects of the present disclosure, the methods and systems described herein provide robust, accurate, usable estimation or modeling of dominant acoustic wavefields with a relatively simple process that requires very little computer resources. The techniques described above enable an operator to see real-time indications of possible reflectors in the surrounding subsurface formations, and to act appropriately during the course of a logging operation.

Generally, the techniques disclosed herein may be implemented on software and/or hardware. For example, they can be implemented in an operating system kernel, in a separate user process, in a library package bound into network applications, on a specially constructed machine, or on a network interface card. In one embodiment, the techniques disclosed herein may be implemented in software such as an operating system or in an application running on an operating system.

A software or software/hardware hybrid implementation of the present techniques may be implemented on a general-purpose programmable machine selectively activated or reconfigured by a computer program stored in memory. Such a programmable machine may be implemented on a general-purpose network host machine such as a personal computer or workstation. Further, the techniques disclosed herein may be at least partially implemented on a card (e.g., an interface card) for a network device or a general-purpose computing device.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A method of processing acoustic waveform data relating to a subterranean formation, comprising:

taking acoustic measurements through the subterranean formation at one or more depths of a borehole traversing a subterranean formation;

deriving a complex and frequency dependent slowness of the formation based on wavefields in the acoustic measurements, wherein deriving the slowness comprises performing parametric inversion for the complex and frequency dependent slowness;

modeling dominant wavefields in the acoustic measurements based on the derived formation slowness;

iteratively minimizing the misfit between input and modeled waveforms by varying and determining a set of geometrical spreading and slowness parameters that minimize the misfit;

generating dominant wavefields based on the set of geometrical spreading and slowness parameters;

subtracting the dominant wavefields from the input waveforms for event signals, whereby the event signals are extracted from the acoustic measurements comprising reflected and/or refracted waveforms in the subterranean formation.

2. A method of processing acoustic waveform data relating to a subterranean formation according to claim 1, wherein:
the derived slowness is complex, having real and imaginary parts.

3. A method of processing acoustic waveform data relating to a subterranean formation according to claim 1, wherein:
the dominant wavefields in the acoustic measurements comprise compressional, shear, Stoneley and casing mode waveforms.

4. A method of processing acoustic waveform data relating to a subterranean formation according to claim 1, further comprising:
decomposing the dominant wavefields in the acoustic measurements.

5. A method of processing acoustic waveform data relating to a subterranean formation according to claim 1, further comprising:
deriving geometrical spreading of direct compressional and shear waveforms in the acoustic measurements.

6. A method of processing acoustic waveform data relating to a subterranean formation according to claim 5, wherein:
geometrical spreading of the direct compressional and shear waveforms is derived before deriving slowness of the formation.

7. A method of processing acoustic waveform data relating to a subterranean formation according to claim 1, further comprising:
deriving attenuation parameter Q for the subterranean formation.

8. A method of processing acoustic waveform data relating to a subterranean formation according to claim 1, further comprising:
analyzing dispersion of Stoneley waveforms for the subterranean formation.

9. A method of processing acoustic waveform data relating to a subterranean formation according to claim 1, wherein:
the measurements taken are sonic measurements.

10. A method of processing acoustic waveform data relating to a subterranean formation according to claim 1, wherein:
the measurements taken are logging measurements.

11. A method of processing acoustic waveform data relating to a subterranean formation according to claim 1, wherein:
the measurements taken are while-drilling measurements.

12. A method of processing acoustic waveform data relating to a subterranean formation according to claim 1, wherein:
the measurements taken are borehole acoustic reflection survey measurements.

13. A method of processing acoustic waveform data relating to a subterranean formation according to claim 1, further comprising:
iteratively minimizing misfit between input and modeled waveforms;
subtracting the modeled waveforms from the input waveforms;
extracting event signals from the acoustic measurements comprising reflected and/or refracted waveforms; and
generating, in real-time with the acoustic measurements, an indication or imaging of acoustic reflectors in the formation.

14. A method of processing acoustic waveform data relating to a subterranean formation according to claim 13, further comprising:
utilizing the indication or imaging of acoustic reflectors for adjusting parameters for logging the subterranean formation.

15. A method of processing acoustic waveform data relating to a subterranean formation according to claim 13, further comprising:
utilizing the indication or imaging of acoustic reflectors in the formation for validation of geo-steering parameters.

16. The method of claim 1, further comprising:
estimating amplitudes of the dominant wavefields;
determining parameters indicative of geometrical spreading;
determining parameters indicative of a real component of the slowness;
determining parameters indicative of a complex component of the slowness; and
refining the estimated dominant wavefields based at least in part on the parameters indicative of the geometrical spreading and the parameters indicative of the real and complex components of the slowness.

17. A system for taking sonic measurements relating to a subterranean formation, comprising:
an acoustic tool comprising at least one source and a plurality of receivers mounted thereon;
a computer in communication with the acoustic tool; and
a set of instructions executable by the computer that, when executed by the computer cause the computer to:
generate acoustic waves with the at least one source;
receive acoustic waveforms through the subterranean formation with the plurality of receivers;
derive a complex and frequency dependent slowness of the formation based on the acoustic waveforms;
model dominant waveforms in the acoustic waveforms based on the derived formation slowness,
wherein deriving the formation slowness comprises performing parametric inversion for the complex and frequency dependent slowness,
wherein the derived complex slowness has real and imaginary parts;
iteratively minimize misfit between input and modeled waveforms by varying and determining a set of geometrical spreading and slowness parameters that minimize the misfit;
generate dominant wavefields based on the set of geometrical spreading and slowness parameters;
subtract the dominant wavefields from the input waveforms for the event signals,
whereby the event signals are extracted from the acoustic waveforms comprising reflected and/or refracted waveforms in the subterranean formation.

* * * * *